Patented Sept. 4, 1945

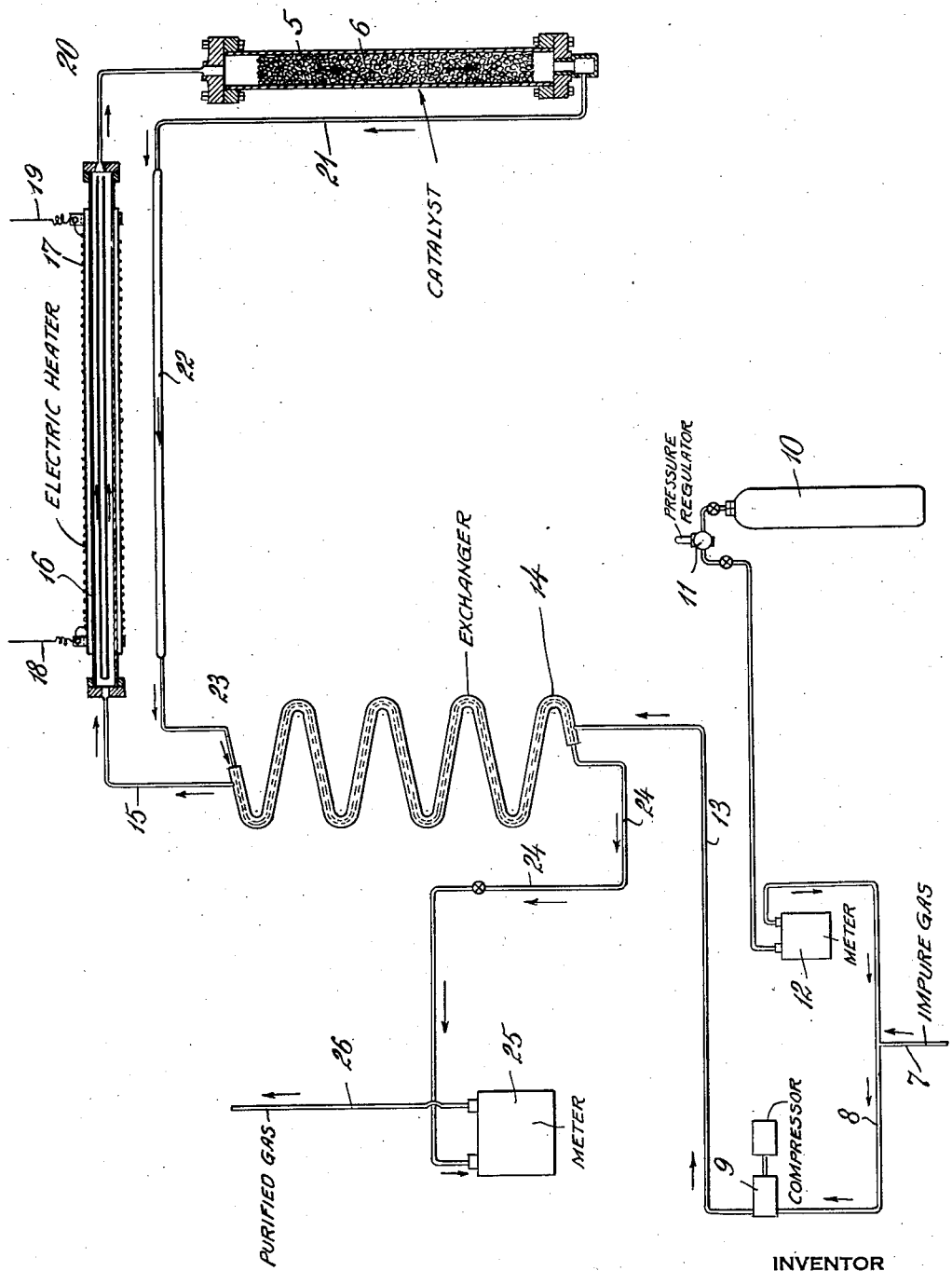

2,384,065

UNITED STATES PATENT OFFICE 2,384,065

PURIFICATION OF GASES

Frederick R. Balcar, Stamford, Conn., assignor to Air Reduction Company, Incorporated, New York, N. Y., a corporation of New York Application July 18, 1941, Serial No. 402,999

2 Claims. (Cl. 23—2)

This invention relates to the purification of gases and particularly to the removal of impurities present in relatively small quantities in which they are nevertheless detrimental to the technical applications of the gases in which such impurities occur.

Several relatively inert gases such as nitrogen, argon, carbon dioxide and the like have numerous commercial applications, as for example in the manufacture of incandescent lamps, in the packing and preservation of foods, in the carbonation of beverages and the like. These gases as produced commercially may contain relatively small amounts of impurities which cannot be removed readily by available methods. Such impurities often have a detrimental effect in the use of the gases in which they occur, out of all proportion to the quantity of impurity present. Thus, for example in the application of nitrogen and argon to the manufacture of incandescent lamps, the gas must contain not more than 0.001% of oxygen and preferably much less, because the presence of oxygen results in rapid deterioration of lamp filaments. Similarly, in the case of nitrogen and carbon dioxide employed in packing and preservation of foods, the presence of oxygen results in the development of undesirable odors and tastes in the product after storage. The presence of oxygen in carbon dioxide employed for the carbonation of soft drinks and other beverages such as beer, similarly produces objectionable odors and tastes, especially if the products are stored in metal containers.

Commercial gases may also contain impurities such as hydrogen, carbon monoxide or gaseous hydrocarbons in relatively minute quantities, and these impurities are likewise detrimental to many of the available applications of the gases in commercial practice.

It is the object of the present invention to provide a simple and effective method for the removal of minute quantities of gaseous impurities from the gases in which they occur and to afford thereby a source of gas free from such impurities which may be utilized without the deleterious effect of such impurities.

Another object of the invention is the provision of a method utilizing catalytic oxidation to remove oxygen, carbon monoxide, hydrogen and gaseous hydrocarbons from inert gases such as nitrogen, argon, carbon dioxide and the like.

Other objects and advantages of the invention will be apparent as it is better understood by reference to the following specification and the accompanying drawing, which illustrates diagrammatically apparatus suitable for the practice of the invention, it being understood that the invention is not limited to the particular apparatus shown and that details of such apparatus well known in the art are omitted for the purpose of clarity.

In carrying out the invention, I rely upon catalytic oxidation, that is to say the conversion of oxygen present for example as an impurity in nitrogen into a readily removable compound such as water, by the addition of hydrogen. In case the impurity consists of hydrogen, carbon monoxide or a gaseous hydrocarbon, I add instead a sufficient quantity of oxygen to the gas to be purified. In other words, a suitable addition is made to the gas in quantity determined by the amount of impurity present therein, and the gas is subjected then, at a suitable temperature and pressure, to the action of a catalyst which will promote the combination of the impurity with the added gas to form a product which is readily separable.

It is not always necessary to add a gas to the gas to be purified according to this process. For example, in a case of electrolytic oxygen and hydrogen, each contains a small amount of the other as impurities. This impurity is easily and simply removed by passage of the gas to be purified over the silver catalyst at an elevated temperature. In this way, it is possible to obtain extremely pure hydrogen or oxygen.

As a catalyst I have found that silver on a suitable inert porous supporting material is most effective in promoting reactions such as those described, since it may be employed for long periods of time without deterioration and consequently at optimum and uniform activity. Any suitable carrier, such as pumice, kieselguhr, and the like, may be employed, but I prefer to use a catalyst having commercially activated alumina, of the kind ordinarily used as a desiccant, as a carrier. The catalyst may be prepared in any convenient way, but a simple method consists in impregnating the activated alumina with a solution of silver nitrate, drying the material and then reducing the silver nitrate by passing hydrogen over it at a temperature of from 300 to 400° C. Enough silver nitrate is added to the alumina so that the finished catalyst contains from about 2 to about 15% by weight of silver. This affords a highly active catalyst which gives satisfactory performance for an indefinitely long period, since it is not susceptible to poisoning by the impurities usually present in commercial gases or by the inert gases themselves. I have used such a catalyst to purify approximately 5,184,000 cubic feet of nitrogen over a period of 4 months, at the end of which period the catalyst was still active.

The reaction can be conducted at normal atmospheric pressure. However, at higher pressures the volume of catalyst required will probably be less and the operating temperature somewhat lower. It is preferable to operate at a pressure of 2,000 pounds or higher. The operating temperature may vary somewhat, depending upon the amount of active surface supplied per unit of catalyst and also on the space velocity used. Both temperature and space velocity may be varied widely with good results, the only essential requirement being that sufficient time be allowed at any given temperature to permit completion of the reaction. The minimum temperature is practical operations is in the neighborhood of 100° C. at atmospheric pressure. In commercial plant operation, it is preferable to operate at about 250° C.

The operation will be better understood by reference to the accompanying drawing in which 5 indicates a catalyst chamber constructed of suitable material to withstand the pressure and the effect of the gas which may pass therethrough. The chamber is filled with a catalyst 6 in suitable form to afford maximum surface contact with the gas.

The gas to be treated enters through a pipe 7 and is delivered to a pipe 8 leading to a compressor 9. The gas to be added may be supplied from the cylinder 10 through a pressure regulator 11 and meter 12 in predetermined amount, depending upon the quantity required to effect the desired reaction. The mixed gases pass from a compressor 9 through a pipe 13 to an exchanger 14 wherein the mixture is subjected to heat exchange with the gas leaving the reaction. From the heat exchanger 14 the gaseous mixture passes through a pipe 15 to a heater 16 where heat may be supplied from any suitable source as for example an electric heating coil 17 supplied with current through conductors 18 and 19. The temperature of the gaseous mixture is raised to the desired point, the heating being controlled to maintain a uniform temperature in the gaseous mixture which is delivered to the catalyst chamber through a pipe 20.

In passing through the catalyst chamber, the desired reaction is effected and the impurity, whether oxygen, hydrogen, carbon monoxide, or gaseous hydrocarbon is converted into a product readily removable from the gas. The gas escapes through a pipe 21, passes through a pipe 22 and thence through a pipe 23 to the heat exchanger 14, thereby giving up a portion of its heat to the incoming gaseous mixture. The gas then escapes through a pipe 24, passes through a meter 25 and is delivered by a pipe 26 to a suitable storage receptacle.

As an example of the operation, I may treat nitrogen containing about 0.5% of oxygen. Nitrogen of this purity is commonly produced in liquefaction plants and cannot be further purified by liquefaction methods without serious losses in the oxygen production of the plant. To remove the oxygen, I add an equivalent amount of hydrogen or other reducing gas, and pass it over the catalyst at a temperature of from 200 to 300° C., and at a space velocity of 5,000 to 10,000 volumes of gas per volume of catalyst per hour. The oxygen present as an impurity is consumed in oxidizing the hydrogen, forming water which is readily removable, and the resulting nitrogen is so free from oxygen that the presence of oxygen cannot be detected with certainty by ordinary methods of analysis. Thus I am able to prepare at relatively slight expense commerically pure nitrogen which is free from oxygen.

In a similar manner and under substantially the same conditions, I can remove oxygen from argon. Likewise, oxygen can be removed from carbon dioxide. If the impurity in the gas consists of hydrogen, carbon monoxide or a gaseous hydrocarbon, I add to the gas sufficient oxygen to combine with such impurity. By passing the gaseous mixture through the catalyst under the conditions described, the impurities may be converted and pure gaseous products may be produced.

As a further example, the invention may be used to remove illuminants from nitrogen. Nitrogen, containing about 0.75% by volume of illuminants and a slight excess of oxygen, was passed through a tube containing the preferred catalyst (10% silver on activated alumina) at a rate of about 1.2 cu. ft. per hour. The temperature of the catalyst was maintained at about 350 to 375° C., and substantially complete reaction of the hydrocarbon gas and the oxygen was obtained. The nitrogen leaving the tube contained only carbondioxide, water vapor and the excess oxygen. The illuminant gas in this case was ethylene.

Various changes may be made in the procedure as described as well as in the apparatus illustrated in the accompanying drawing, without departing from the invention or sacrificing any of the advantages thereof.

I claim:

1. The method of removing small quantities of oxygen present as an impurity in nitrogen, to produce nitrogen containing not more than 0.001% of oxygen, the essential features of which consist in adding the amount of hydrogen necessary to combine with the oxygen present in the gas, compressing the mixture, heating the mixture to a temperature of about 250° C., and passing the heated mixture at a space velocity of 5,000 to 10,000 volumes of gas per volume of catalyst per hour over a catalyst consisting of activated alumina impregnated with silver.

2. The method of removing small quantities of oxygen present as an impurity in nitrogen, to produce nitrogen containing not more than 0.001% of oxygen, the essential features of which consist in adding the amount of hydrogen necessary to combine with the oxygen present in the gas, compressing the mixture, heating the mixture to a temperature of from 100° to 375° C., and passing the heated mixture at a space velocity of 5,000 to 10,000 volumes of gas per volume of catalyst per hour over a catalyst consisting of activated alumina impregnated with silver.

FREDERICK R. BALCAR.